United States Patent
Sun et al.

(10) Patent No.: US 11,823,820 B2
(45) Date of Patent: Nov. 21, 2023

(54) PTC STARTER

(71) Applicant: HANGZHOU STAR SHUAIER ELECTRIC APPLIANCE CO., LTD., Hangzhou (CN)

(72) Inventors: Hai Sun, Hangzhou (CN); Yujun Xu, Hangzhou (CN); Huamin Sun, Hangzhou (CN); Wencheng Lu, Hangzhou (CN); Chenggang Fan, Hangzhou (CN)

(73) Assignee: HANGZHOU STAR SHUAIER ELECTRIC APPLIANCE CO., LTD., Hangzhou (CN)

( * ) Notice: Subject to any disclaimer, the term of this patent is extended or adjusted under 35 U.S.C. 154(b) by 0 days.

(21) Appl. No.: 17/861,275

(22) Filed: Jul. 11, 2022

(65) Prior Publication Data
US 2023/0039950 A1    Feb. 9, 2023

(30) Foreign Application Priority Data
Aug. 6, 2021    (CN) .......................... 202110901499.3

(51) Int. Cl.
*H01C 7/02*     (2006.01)
*H01C 1/14*     (2006.01)
*H02P 1/42*     (2006.01)

(52) U.S. Cl.
CPC ............. *H01C 7/02* (2013.01); *H01C 1/1406* (2013.01); *H02P 1/42* (2013.01)

(58) Field of Classification Search
CPC ........... H01C 7/02; H01C 1/1406; H02P 1/42; H02P 1/423
See application file for complete search history.

(56) References Cited

U.S. PATENT DOCUMENTS

| | | | |
|---|---|---|---|
| 6,172,593 B1 * | 1/2001 | Mochida | H01C 1/024 338/234 |
| 8,174,354 B2 * | 5/2012 | Cohen | H01C 1/014 338/234 |

(Continued)

FOREIGN PATENT DOCUMENTS

| | | | |
|---|---|---|---|
| CN | 103489551 A | | 1/2014 |
| CN | 208623492 U | * | 3/2019 |

OTHER PUBLICATIONS

CN208623492, Chen et al., machine translation. (Year: 2019).*

*Primary Examiner* — Kyung S Lee
(74) *Attorney, Agent, or Firm* — Bayramoglu Law Offices LLC

(57) ABSTRACT

A PTC starter is provided. A first pin is electrically connected to a first electrode of a thermistor. The thermistor and an elastic element are arranged in respective mounting cavities. The elastic element is provided with a connecting piece, through which a second pin is electrically connected to or disconnected from a second electrode of the thermistor. In a normal state of the thermistor, the elastic element is in an elastic deformation state, a first contact part and a second contact part of the elastic element are in electrical contact with the second electrode of the thermistor and the second pin respectively. After the thermistor ruptures, the elastic element resets, which causes the connecting piece to move so that the second contact part of the elastic element detaches from the second pin. An isolation structure is provided between the thermistor mounting cavity and the elastic element mounting cavity.

14 Claims, 10 Drawing Sheets

(56) References Cited

U.S. PATENT DOCUMENTS

| | | | |
|---|---|---|---|
| 9,431,821 B2* | 8/2016 | Chen | H01C 1/014 |
| 10,984,927 B2* | 4/2021 | Rotulo | H01C 7/02 |
| 2008/0315983 A1* | 12/2008 | Oh | H01C 7/02 |
| | | | 337/14 |

* cited by examiner

PTC STARTER

CROSS-REFERENCE TO THE RELATED APPLICATIONS

This application is based upon and claims priority to Chinese Patent Application No. 202110901499.3, filed on Aug. 6, 2021, the entire contents of which are incorporated herein by reference.

TECHNICAL FIELD

The present invention relates to a positive temperature coefficient (PTC) starter, which is mainly applicable to the starting of a compressor motor with a run capacitor or start capacitor and can also be used for the starting of a general single-phase alternating current (AC) motor.

BACKGROUND

At present, most refrigeration compressors use split-phase type single-phase asynchronous motors. In order to make a motor start voluntarily, two sets of windings are arranged on a stator core of the motor, namely, a main winding used to generate a main magnetic field and an auxiliary winding used to generate an auxiliary magnetic field. After energization, the rotating magnetic field synthesized by both the main magnetic field and the auxiliary magnetic field cuts a stationary rotor to generate an electromagnetic torque, which makes the rotor start to rotate, and a torque of the rotor increases gradually after start. When the rotating speed reaches 75%-80% of the synchronous speed, the auxiliary winding is cut off, and the motor can continue to rotate and speed up until the motor reaches the balance with external impedance torque, and the rotating speed keeps steady. Usually, a PTC starter is used to complete the starting process. In a refrigeration compressor, the auxiliary winding of the motor is in series with the PTC starter, and the PTC starter conducts with small resistance at room temperature. When starting, due to the thermal effect of the current, the temperature of PTC component rises in a short period. After reaching the Curie point, the resistance of the PTC component is quickly increased to tens kilo-ohms or more. At this time, an impedance ratio of the auxiliary winding is equivalent to an open circuit with the current of starting winding connected to the PTC component dropping to less than a dozen milliamps. As a result, the motor completes the starting and turns into a normal operation.

After being used for a long time or subjected to environmental conditions, the physical structure of the prior PTC component may deteriorate, creating heat and spark due to the abnormality in the starter during work and rupturing the PTC component inside the starter into fragments. Since the fragments may cause the left and right connecting terminals to form short circuit, issues, such as arc discharging, overheating, or overcurrent may occur, and the compressor motor may even be burned out.

CN patent application CN103489551A discloses an electronic device that includes an electronic element with a first electrode and a second electrode disposed on the opposite sides thereof; a first terminal and a second terminal; a support mounted to and electrically connected with the first terminal; a second support mounted to and electrically connected with the second terminal, the second support including a second contact part in contact with and electrically connected with the second electrode; and a third elastic support including a third contact part in contact with one of the first electrode and the second electrode. When the electronic element ruptures in a failure state, the third elastic support is provided to push the electronic element to be separated from the support and one support of the second supports, and push the electronic element to allow a first contact part and a second contact part at the third elastic support to be separated from fragments of the electronic element. When the electronic element ruptures in a failure state, the third elastic support and the support is electrically insulated from one support of the second supports and a terminal electrically connected to the one support.

The patent document lists three embodiments for illustration, each of which has some defects.

The first embodiment is shown in FIG. 3 of this patent. The first contact part 71, the second contact part 81, the third elastic contact part 63, and the electronic element 5 are arranged in the same cavity space. When the electronic element 5 ruptures, the two forks of the third contact part 63 can push away fragments of the electronic element 5. In reality, if there are small granular fragments, the fragments may still be stuck between the third contact part 63 and the second contact part 81, failing to achieve the purpose of completely disconnecting the electronic element 5 from the circuit, thus the problem of short circuit or even potential risk of motor burnout still exists.

The second embodiment is shown in FIG. 7 of this patent. The electronic element 5 is supported by the first contact part 71', the second contact part 81', the third contact part 63', and the third contact part 64', and they are all arranged in the same cavity space. When the electronic element 5 ruptures, the generated tiny granular fragments may still be stuck between the third contact part 63' and the second contact part 81', failing to achieve the purpose of completely disconnecting the electronic element 5 from the circuit, thus the problem of short circuit or even potential risk of motor burnout still exists.

The third embodiment is shown in FIG. 8 and FIG. 9 of this patent. The electronic element 5 is supported by the first contact part 71", the second contact part 81", the fifth contact part 82", and the third elastic support 6, and they are all arranged in the same cavity space. When the electronic element 5 ruptures, the generated tiny granular fragments may still be stuck between the third contact part 63" and the first contact part 71", failing to achieve the purpose of completely disconnecting the electronic element 5 from the circuit, thus the problem of short circuit or even potential risk of motor burnout still exists.

A lot of experiments have shown that when the thermistor ruptures in the fault state of the PTC starter, the probability of tiny granular fragments emerging is not less than ten percent. The technical solutions provided by the above-mentioned patent fail to achieve the purpose of completely disconnecting the electronic element from the circuit if the thermistor ruptures into tiny granular fragments, thus the problem of short circuit or even potential risk of motor burnout still exists.

SUMMARY

An object of the present invention is to overcome the above-mentioned deficiencies in the prior art and provide a PTC starter with reasonable structural design and improved safety and reliability.

The technical solution used in the present invention to solve the above problem is to provide a PTC starter. The PTC starter includes a housing, a first pin, a second pin, and a thermistor. The first pin, the second pin, and the thermistor are arranged in the housing. The first pin is electrically connected to a first electrode of the thermistor. The housing is provided with a thermistor mounting cavity, and the thermistor is arranged in the thermistor mounting cavity. The PTC starter further includes an elastic element. The housing is provided with an elastic element mounting cavity, and the elastic element is arranged in the elastic element mounting cavity. A connecting piece is arranged on the elastic element. Two ends of the connecting piece are provided with a first contact part of the elastic element and a second contact part of the elastic element, respectively. The second pin is electrically connected to or disconnected from a second electrode of the thermistor through the connecting piece. When the thermistor is in a normal state, the elastic element is in an elastic deformation state, the first contact part of the elastic element is in electrical contact with the second electrode of the thermistor, the second contact part of the elastic element is in electrical contact with the second pin, and the second pin is electrically connected to the second electrode of the thermistor. After the thermistor ruptures, the elastic element resets, and the connecting piece is moved under a reset effect to push away the ruptured thermistor, so that the second contact part of the elastic element is disengaged from the second pin to cut off an electrical connection between the second pin and the second electrode of the thermistor. An isolation structure is provided between the thermistor mounting cavity and the elastic element mounting cavity to prevent fragments of the thermistor in the thermistor mounting cavity from spreading into the elastic element mounting cavity.

In the present invention, the elastic element is further provided with a fixed piece and an elastic arm. The fixed piece is arranged in the elastic element mounting cavity, and the connecting piece is elastically arranged on the fixed piece through the elastic arm.

In the present invention, the isolation structure is an isolation wall, and the isolation wall is fixed in the housing to isolate the thermistor mounting cavity and the elastic element mounting cavity.

In the present invention, the isolation structure includes a base isolation wall and a cover isolation wall. The base isolation wall and the cover isolation wall are combined to isolate the thermistor mounting cavity and the elastic element mounting cavity.

In the present invention, the PTC starter further includes a first elastic member, and the first elastic member is arranged in the housing. The first elastic member is provided with a first elastic member contact part, and the first elastic member contact part is in contact with the first electrode of the thermistor. The first pin is provided with a first terminal contact part, and the first pin is in electrical contact with the first electrode of the thermistor through the first terminal contact part to realize an electrical connection between the first pin and the first electrode of the thermistor. Under the three-point clamping of the first terminal contact part, the first elastic member contact part, and the first contact part of the elastic element, the thermistor is fixedly arranged in the thermistor mounting cavity.

In the present invention, the first pin is provided with a first terminal, and the first terminal contact part is provided at an end of the first terminal.

In the present invention, the PTC starter further includes a second elastic member. The second elastic member is electrically connected to the first pin. The second elastic member is provided with a first contact part of the second elastic member and a second contact part of the second elastic member, and both the first contact part of the second elastic member and the second contact part of the second elastic member are in electrical contact with the first electrode of the thermistor to realize an electrical connection between the first pin and the first electrode of the thermistor. Under the three-point clamping of the first contact part of the second elastic member, the second contact part of the second elastic member, and the first contact part of the elastic element, the thermistor is fixedly arranged in the thermistor mounting cavity.

In the present invention, the PTC starter further includes a support member, and the support member is fixedly arranged in the housing. The support member is provided with a support member contact part, and the support member contact part is in contact with the first electrode of the thermistor. The first pin is elastically provided with a first terminal, and a first terminal contact part is arranged at an end of the first terminal. The first terminal contact part is in electrical contact with the first electrode of the thermistor to realize an electrical connection between the first pin and the first electrode of the thermistor. Under the three-point clamping of the first terminal contact part, the support member contact part, and the first contact part of the elastic element, the thermistor is fixedly arranged in the thermistor mounting cavity.

In the present invention, the second pin is provided with a second pin contact part, and the second contact part of the elastic element is in electrical contact with or disengaged from the second pin through the second pin contact part.

In the present invention, when the second elastic member is in an elastic deformation state, the first contact part of the second elastic member and the second contact part of the second elastic member are in electrical contact with the first electrode of the thermistor.

In the present invention, when the first terminal is in an elastic deformation state, the first terminal contact part is in electrical contact with the first electrode of the thermistor.

In the present invention, when the first elastic member is in an elastic deformation state, the first elastic member contact part is in contact with the first electrode of the thermistor.

In the present invention, the first contact part of the elastic element is in electrical contact with the middle of the second electrode of the thermistor. The first terminal contact part and the first elastic member contact part are distributed on two sides of a center line of the first contact part of the elastic element and are in electrical contact with an edge portion of the first electrode of the thermistor.

In the present invention, the first contact part of the elastic element is in electrical contact with the middle of the second electrode of the thermistor. The first contact part of the second elastic member and the second contact part of the second elastic member are distributed on two sides of a center line of the first contact part of the elastic element and are in electrical contact with an edge portion of the first electrode of the thermistor.

In the present invention, the first contact part of the elastic element is in electrical contact with the middle of the second electrode of the thermistor. The first terminal contact part and the support member contact part are distributed on two sides of a center line of the first contact part of the elastic element and are in electrical contact with an edge portion of the first electrode of the thermistor.

Compared with the prior art, the present invention has the following advantages and effects. The second pin of the present invention is not directly electrically connected to the second electrode. The second pin is electrically connected to or disconnected from the second electrode of the thermistor through the connecting piece, so that a disconnection point is set between the second pin and the second electrode. The disconnection point and the thermistor are not in the same mounting cavity. Moreover, an isolation structure is provided between the thermistor mounting cavity and the elastic element mounting cavity to prevent fragments of the thermistor in the thermistor mounting cavity from spreading into the elastic element mounting cavity. In this way, by preventing fragments of the thermistor from entering the cavity of the disconnection point, the purpose of avoiding short-circuiting and improving safety and reliability is achieved.

DETAILED DESCRIPTION OF THE EMBODIMENTS

Figure 1:
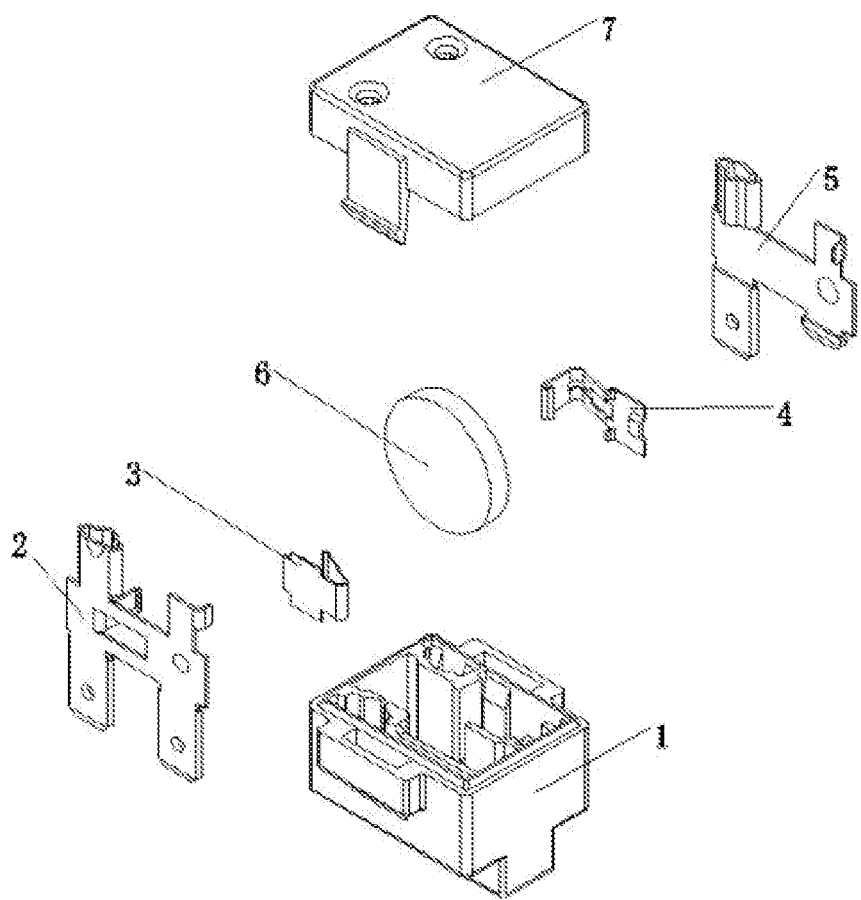
FIG. 1 is an explosive view of the three-dimensional structure of Embodiment I of the present invention.
Figure 2:
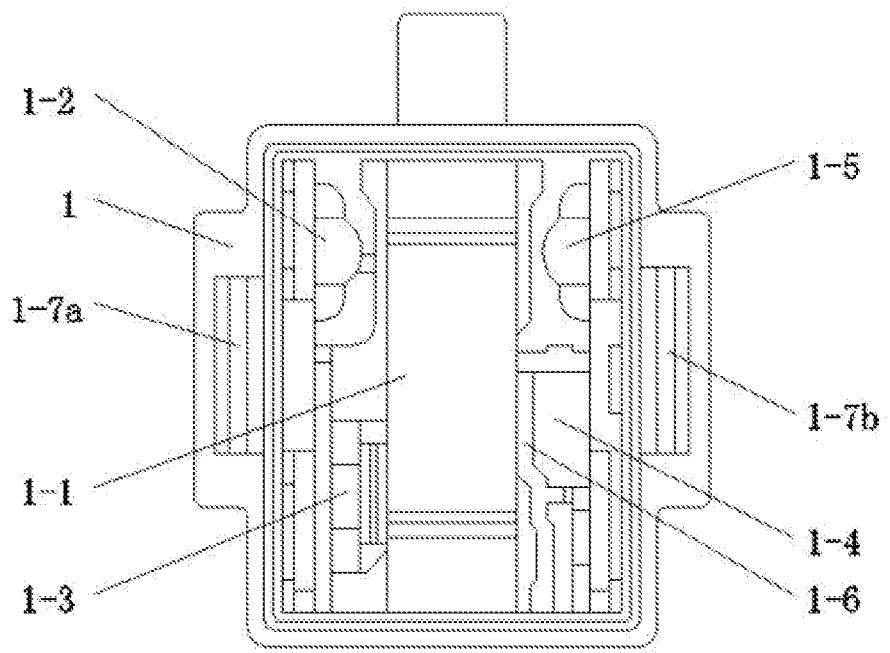
FIG. 2 is a top view of the structure of the base in Embodiment I of the present invention.
Figure 3:
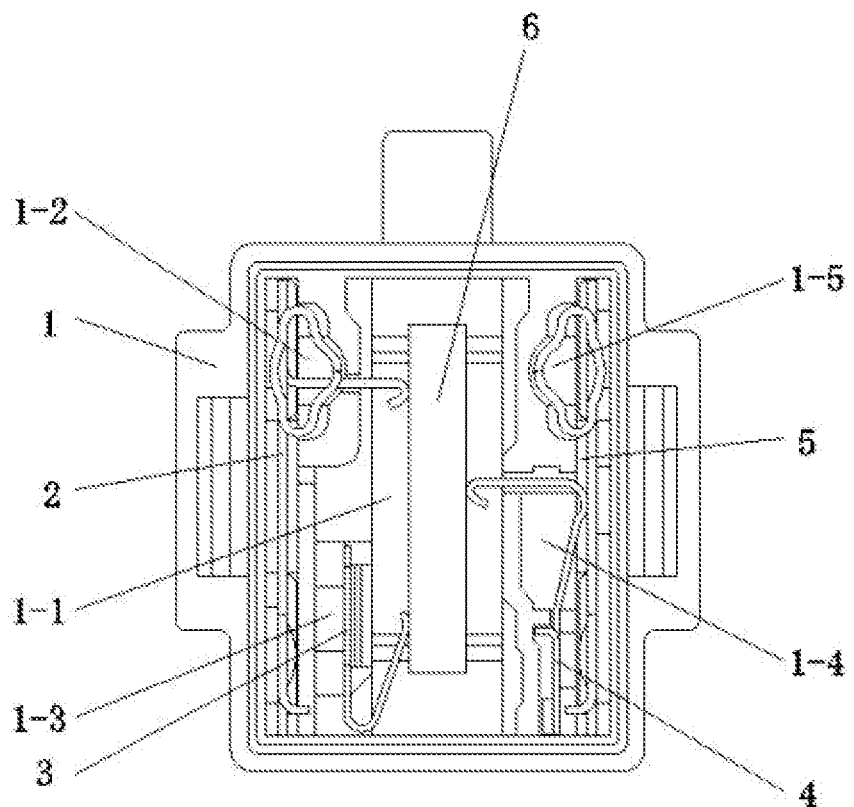
FIG. 3 is a top view of the structure of Embodiment I of the present invention with a cover removed.
Figure 4:
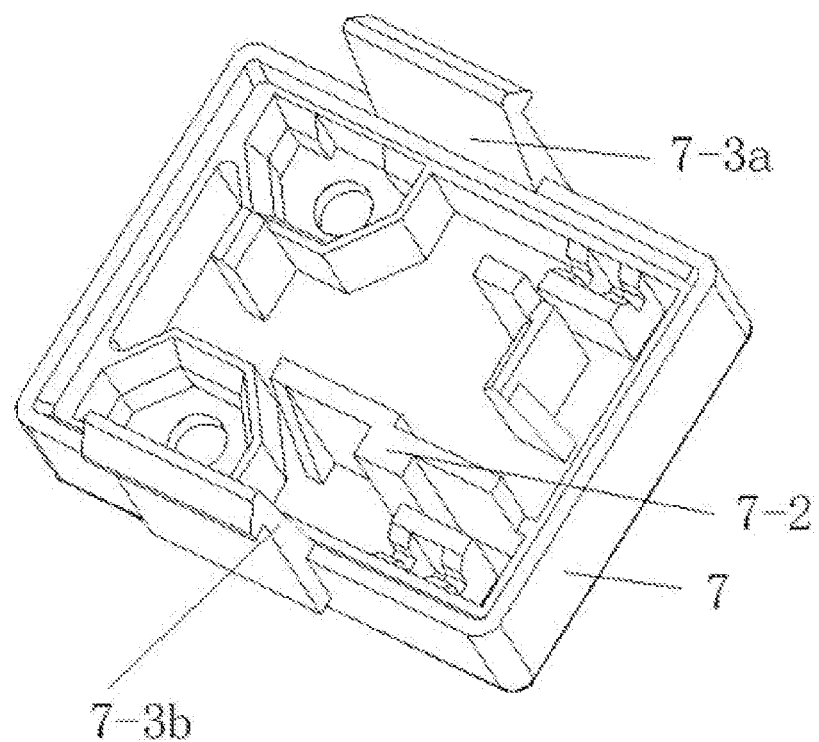
FIG. 4 is a schematic diagram of the three-dimensional structure of the cover in Embodiment I of the present invention.
Figure 5:
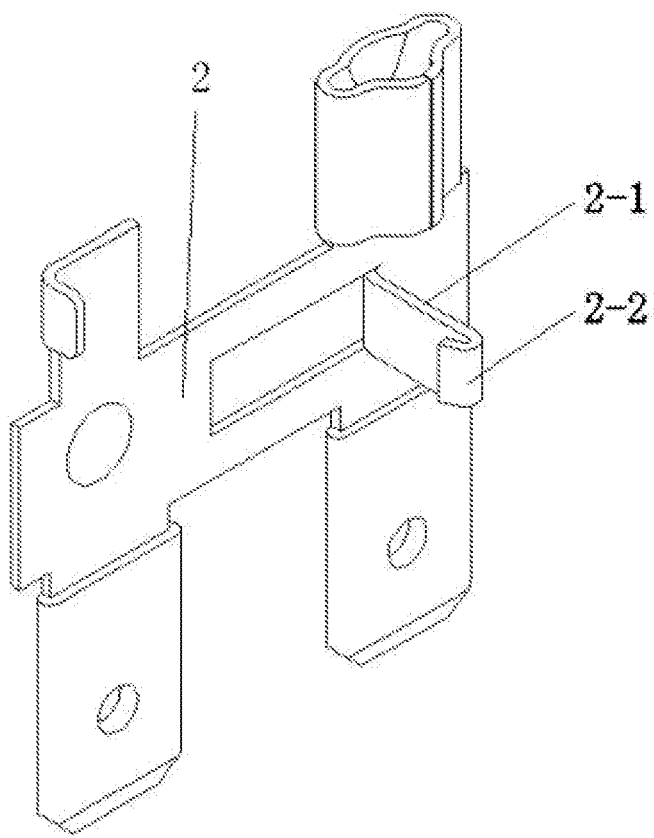
FIG. 5 is a schematic diagram of the three-dimensional structure of a first pin in Embodiment I of the present invention.
Figure 6:
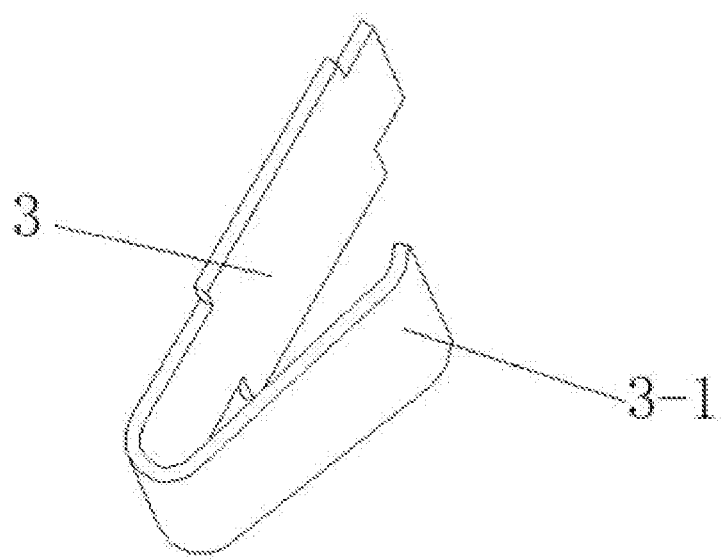
FIG. 6 is a schematic diagram of the three-dimensional structure of a first elastic member in Embodiment I of the present invention.
Figure 7:
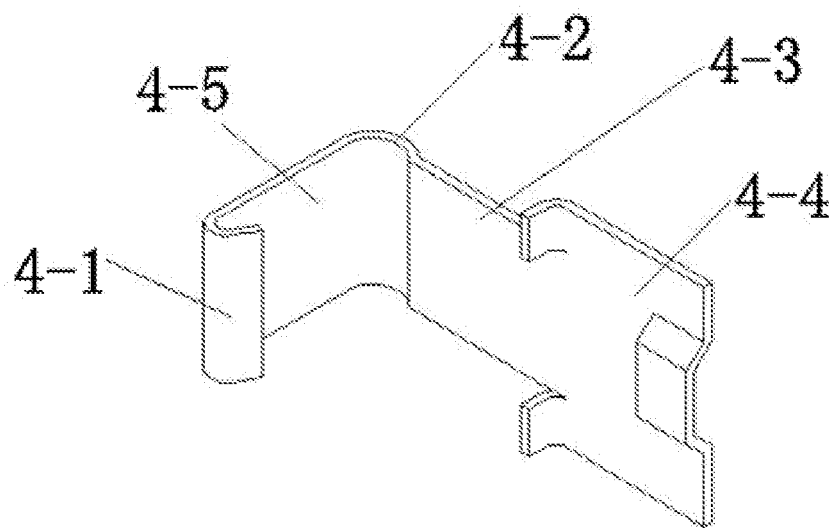
FIG. 7 is a schematic diagram of the three-dimensional structure of an elastic element of Embodiment I of the present invention.
Figure 8:
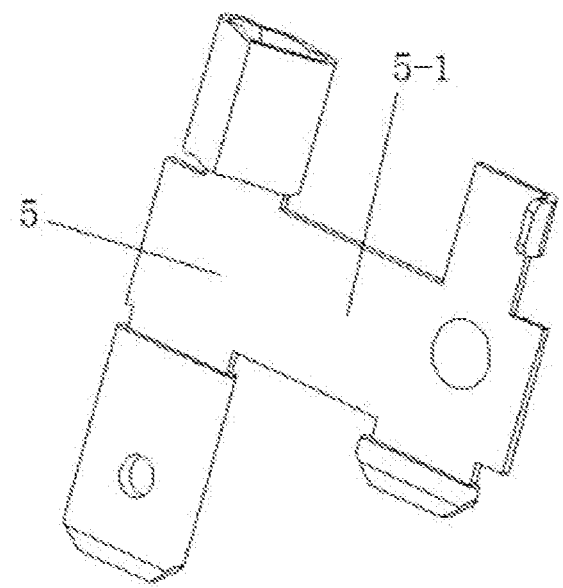
FIG. 8 is a schematic diagram of the three-dimensional structure of a second pin in Embodiment I of the present invention.
Figure 9:
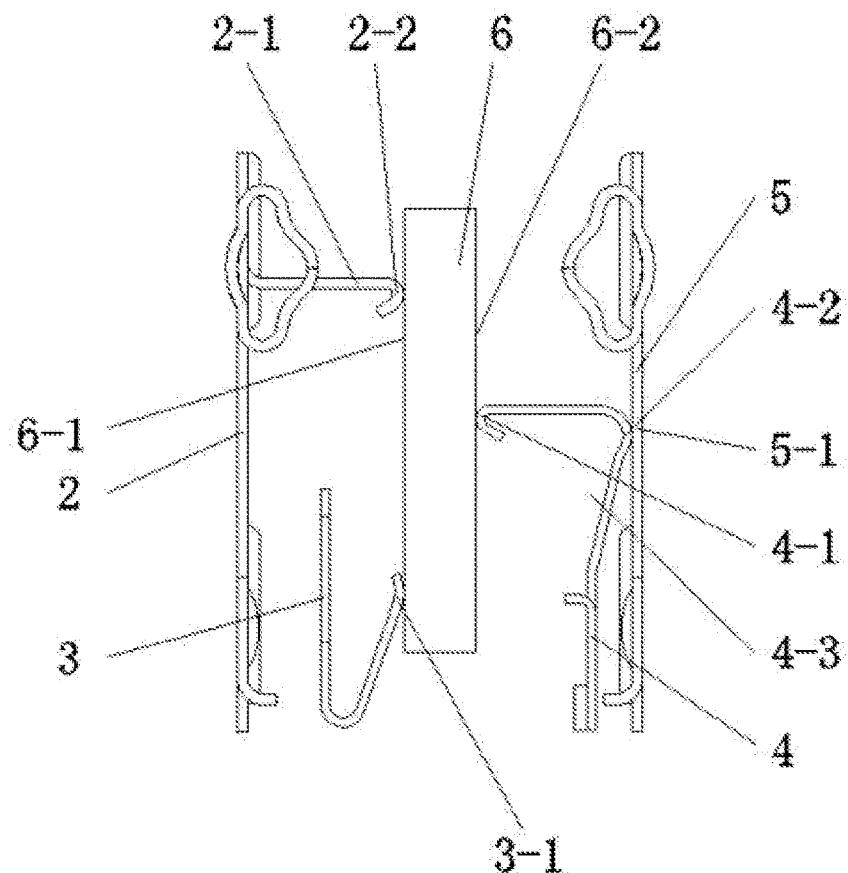
FIG. 9 is a schematic diagram showing the connection between the thermistor and each contact end in Embodiment I of the present invention.
Figure 10:
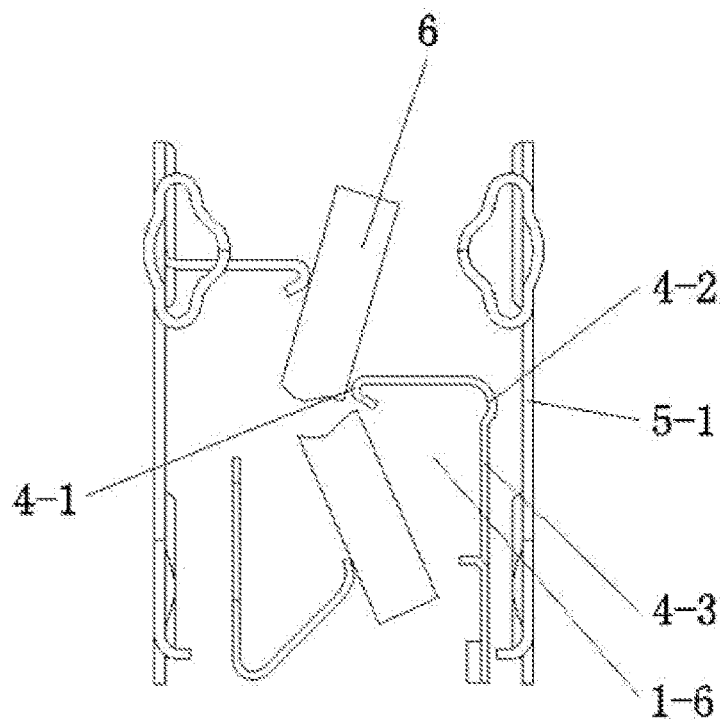
FIG. 10 is a schematic diagram of a ruptured state of the thermistor in Embodiment I of the present invention.

The present invention is described in detail below with reference to the drawings in conjunction with the embodiments. The following embodiments are explanations of the present invention, and the present invention is not limited to the following embodiments.

Embodiment I

As shown in FIGS. 1-11, in this embodiment, the PTC starter includes a housing, the first pin 2, the first elastic member 3, the elastic element 4, the second pin 5, and the thermistor 6.

The first elastic member 3 and the elastic element 4 both employ reeds.

The housing includes the base 1 and the cover 7. The left and right sides of the base 1 are provided with the left slot 1-7a and the right slot 1-7b, respectively. The left and right sides of the cover 7 are provided with the left claw 7-3a and the right claw 7-3b, respectively. The left claw 7-3a is fixedly clamped with the left slot 1-7a, and the right claw 7-3b is fixedly clamped with the right slot 1-7b, so that the cover 7 and the base 1 are fixedly connected.

The base 1 is provided with the thermistor mounting cavity 1-1, the first pin mounting cavity 1-2, the first elastic member mounting cavity 1-3, the elastic element mounting cavity 1-4, and the second pin mounting cavity 1-5. The thermistor 6 is arranged in the thermistor mounting cavity 1-1. The first pin 2 is arranged in the first pin mounting cavity 1-2. The first elastic member 3 is arranged in the first elastic member mounting cavity 1-3. The first elastic member 3 is arranged in the first elastic member mounting cavity 1-3. The elastic element 4 is arranged in the elastic element mounting cavity 1-4. The second pin 5 is arranged in the second pin mounting cavity 1-5. In this way, the first pin 2, the first elastic member 3, the elastic element 4, the second pin 5, and the thermistor 6 are arranged in the base 1.

The first pin 2 is provided with the first terminal 2-1, and the first terminal contact part 2-2 is arranged at an end of the first terminal 2-1. The first pin 2 and the first terminal 2-1 may be integrally connected or in other connection manners. The first pin 2 is in electrical contact with the first electrode 6-1 of the thermistor 6 through the first terminal contact part 2-2 arranged on the first terminal 2-1.

The first elastic member 3 is provided with the first elastic member contact part 3-1. After elastic deformation, the first elastic member 3 is in contact with the first electrode 6-1 of the thermistor 6 through the first elastic member contact part 3-1, where this contact is not an electrical contact. In the normal mounting state of the PTC starter, the elastic force of the first elastic member 3 acting on the thermistor 6 is always greater than the elastic force of the elastic arm 4-3.

The first terminal contact part 2-2 and the first elastic member contact part 3-1 are distributed on two sides of the center line of the first contact part 4-1 of the elastic element and opposite to the first contact part 4-1 of the elastic element. The first terminal contact part 2-2 and the first elastic member contact part 3-1 are in electrical contact with an edge portion of the first electrode 6-1 of the thermistor.

The second pin 5 is provided with the second pin contact part 5-1.

The elastic element 4 is provided with the fixed piece 4-4, the elastic arm 4-3, and the connecting piece 4-5. The fixed piece 4-4 is arranged in the elastic element mounting cavity 1-4. The connecting piece 4-5 is elastically arranged on the fixed piece 4-4 through the elastic arm 4-3. Two ends of the connecting piece 4-5 are provided with the first contact part 4-1 of the elastic element and the second contact part 4-2 of the elastic element, respectively. The elastic arm 4-3 has an elastic structure. When or after the force applied to the elastic element 4 through the thermistor is removed or after it's removed, the elastic structure has a spring force that can disengage the second contact part 4-2 of the elastic element from the second pin contact part 5-1.

The second pin 5 is electrically connected to or disconnected from the second electrode 6-2 of the thermistor 6 by the connecting piece 4-5. When the thermistor 6 is in a normal state with the elastic element 4 in an elastic deformation state, the first contact part 4-1 of the elastic element is in electrical contact with the middle of the second electrode 6-2 of the thermistor 6, the second contact part 4-2 of the elastic element is in electrical contact with the second pin contact part 5-1 to form an electrical circuit. Under the three-point clamping of the first terminal contact part 2-2, the first elastic member contact part 3-1, and the first contact part 4-1 of the elastic element, the thermistor 6 is maintained in a force balance, resulting in that the thermistor 6 is fixedly arranged in the thermistor mounting cavity 1-1 and remains in a static state. When the PTC starter is in a fault state, after the thermistor 6 ruptures, the first terminal contact part 2-2, the first elastic member contact part 3-1, and the first contact part 4-1 of the elastic element in relation to the thermistor 6 cease to exist in the force balance state, and the elastic element 4 elastically resets. At this time, the connecting piece 4-5 moves under the elastic reset effect of the elastic arm 4-3 of the elastic element, that is, the connecting piece 4-5 moves under the elastic reset effect of the elastic element 4, and pushes away the fragments of the ruptured thermistor 6, while the second contact part 4-2 of the elastic element is disengaged from the second pin contact part 5-1. At this time, the distance between the second contact part 4-2 of the elastic element and the second pin contact part 5-1 is sufficient to cut off the electrical connection between the second pin 5 and the second electrode 6-2 of the thermistor 6 to cut off the circuit.

An isolation structure is provided between the thermistor mounting cavity 1-1 and the elastic element mounting cavity 1-4 to prevent fragments of the thermistor in the thermistor mounting cavity 1-1 from spreading into the elastic element mounting cavity 1-4. The isolation structure is fixed in the housing to isolate the thermistor mounting cavity 1-1 and the elastic element mounting cavity 1-4. The isolation structure may be an isolation wall. In this embodiment, the isolation structure includes the base isolation wall 1-6 and the cover isolation wall 7-2. The base isolation wall 1-6 is fixedly arranged on the base 1, and the cover isolation wall 7-2 is fixedly arranged on the cover 7. The base isolation wall 1-6 and the cover isolation wall 7-2 are combined to isolate the thermistor mounting cavity 1-1 and the elastic element mounting cavity 1-4.

Figure 11:
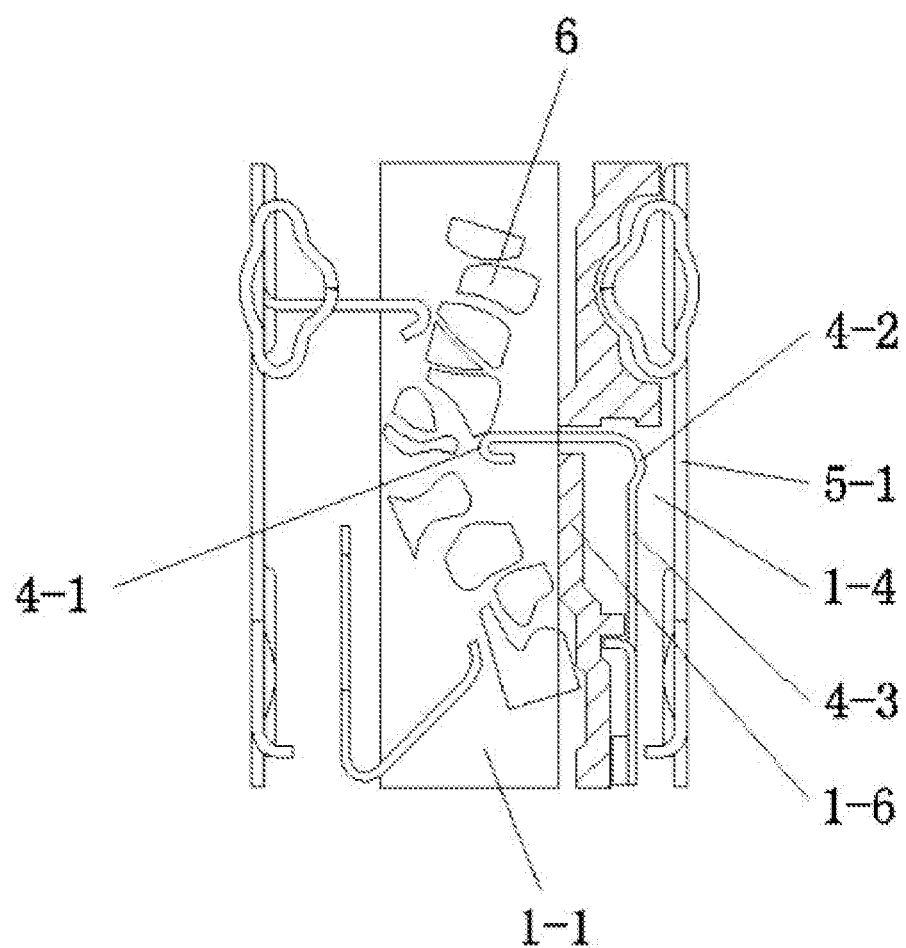
FIG. 11 is a schematic diagram of the state of the thermistor rupturing into small granular fragments in Embodiment I of the present invention.

As shown in FIG. 11, when the PTC starter is in a fault state and the thermistor 6 ruptures into small granular fragments, under the action of the elastic force of the elastic arm 4-3 of the elastic element, the elastic element contact part 4-1 pushes away the fragments of the ruptured thermistor 6, while the second contact part 4-2 of the elastic element is disengaged from the second pin contact part 5-1. At the same time, through the protective effect of the isolation structure, the small granular fragments in the thermistor mounting cavity 1-1 are prevented from spreading into the elastic element mounting cavity 1-4 to avoid another hidden danger of short circuit between the second contact part 4-2 of the elastic element and the second pin contact part 5-1, which improves the reliability of cutting off the circuit.

Embodiment II

Figure 12:
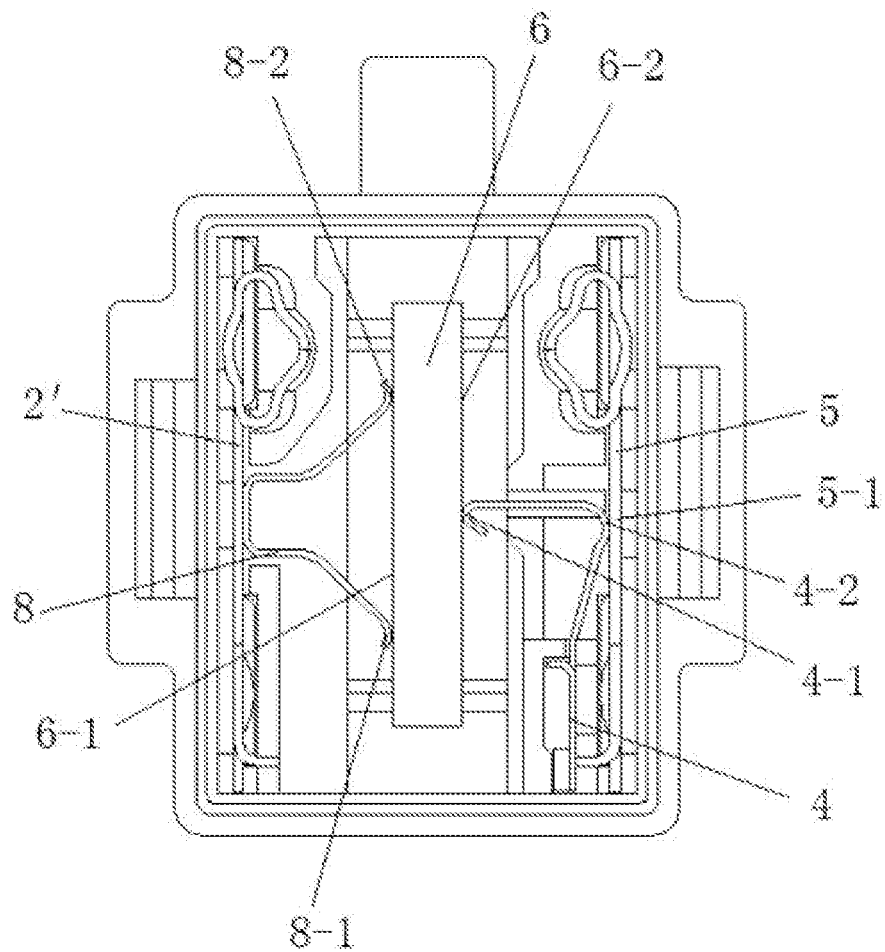
FIG. 12 is a schematic diagram of the structure of Embodiment II of the present invention.
Figure 13:
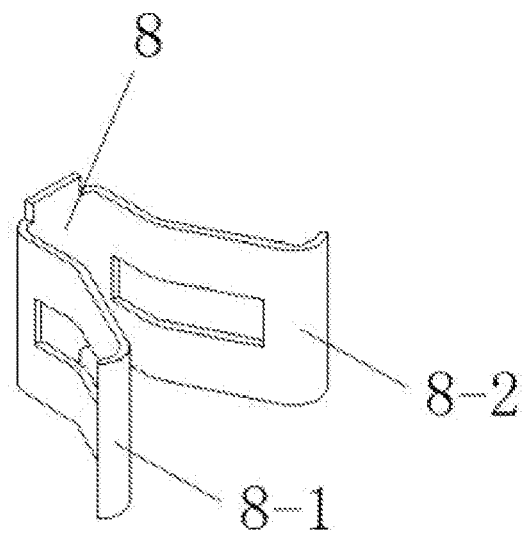
FIG. 13 is a schematic diagram of the three-dimensional structure of a second elastic member in Embodiment II of the present invention.
Figure 14:
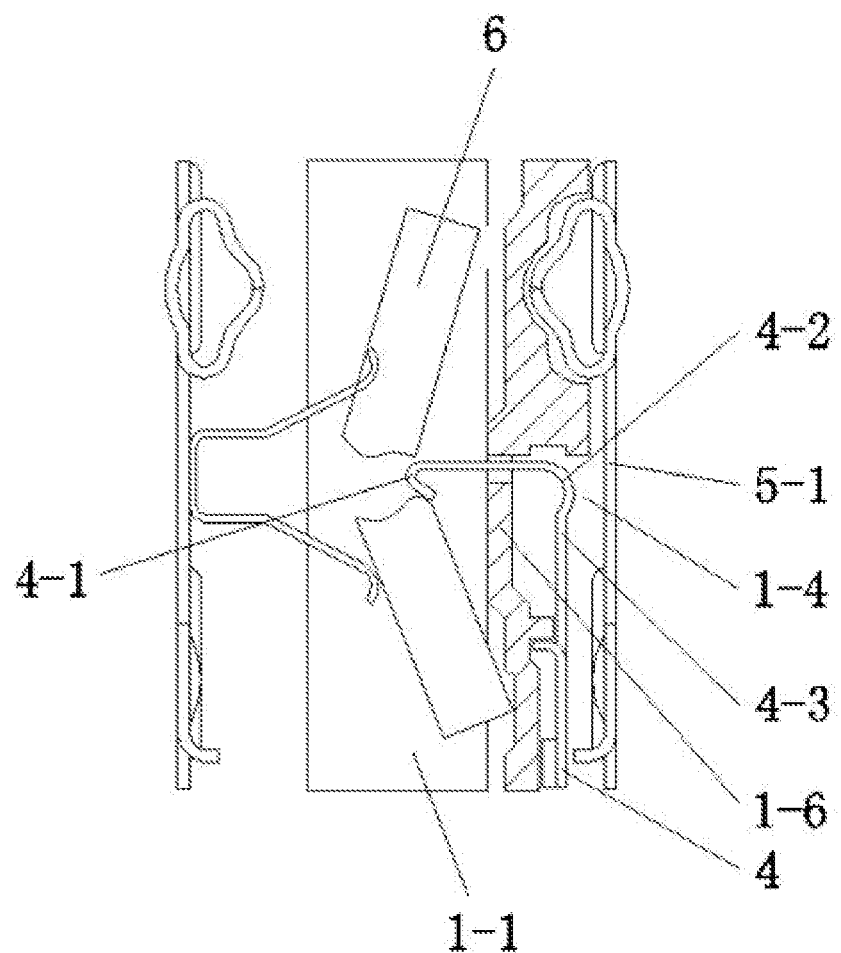
FIG. 14 is a schematic diagram of a ruptured state of the thermistor in Embodiment II of the present invention.

FIGS. 12-14 are schematic diagrams of Embodiment II of the present invention. The structure of the Embodiment II is the same or similar to that of Embodiment I except for the differences expressed below.

The first terminal 2-1 and the first terminal contact part 2-2 in Embodiment I are removed from the first pin 2' in this embodiment. Moreover, and the first elastic member 3 in Embodiment I is removed, and the second elastic member 8 is added in this embodiment. The second elastic member 8 employs a reed.

The second elastic member 8 is electrically connected to the first pin 2'. The second elastic member 8 is elastically provided with the first contact part 8-1 of the second elastic member and the second contact part 8-2 of the second elastic member. When the second elastic member 8 is in an elastic deformation state, both the first contact part 8-1 of the second elastic member and the second contact part 8-2 of the second elastic member are in electrical contact with the first electrode 6-1 of the thermistor 6, so that the first pin 2' is electrically connected to the first electrode 6-1 of the thermistor 6 through the second elastic member 8. The first contact part 8-1 of the second elastic member and the second contact part 8-2 of the second elastic member are distributed on two sides of the center line of the first contact part 4-1 of the elastic element and opposite to the first contact part 4-1 of the elastic element. The first contact part 8-1 of the second elastic member and the second contact part 8-2 of the second elastic member are in electrical contact with an edge portion of the first electrode 6-1 of the thermistor. In this way, the function of the first elastic member contact part 3-1 and the first terminal contact part 2-2 in Embodiment I is realized. When the thermistor 6 is in a normal state, under the three-point clamping of the first contact part 8-1 of the second elastic member, the second contact part 8-2 of the second elastic member, and the first contact part 4-1 of the elastic element, the thermistor 6 is maintained in a force balance, resulting in that the thermistor 6 is fixedly arranged in the thermistor mounting cavity 1-1 and remains in a static state.

In the embodiment, the first pin 2' and the second elastic member 8 may be integrally connected or in other connection manners.

As shown in FIG. 14, in the present invention, when the PTC starter is in a fault state and the thermistor 6 ruptures into large fragments, under the action of the elastic force of the elastic arm 4-3 of the elastic element, the elastic element contact part 4-1 pushes away the fragments of the ruptured thermistor 6, while the second contact part 4-2 of the elastic element is disengaged from the second pin contact part 5-1. At this time, the distance between the second contact part 4-2 of the elastic element and the second pin contact part 5-1 is sufficient to cut off the electrical connection between the second pin 5 and the second electrode 6-2 of the thermistor 6 to cut off the circuit. At the same time, through the protective effect of the isolation structure, the small granular fragments in the thermistor mounting cavity 1-1 are prevented from spreading into the elastic element mounting cavity 1-4 to avoid another hidden danger of short circuit between the second contact part 4-2 of the elastic element and the second pin contact part 5-1, which improves the reliability of cutting off the circuit.

Embodiment III

Figure 15:
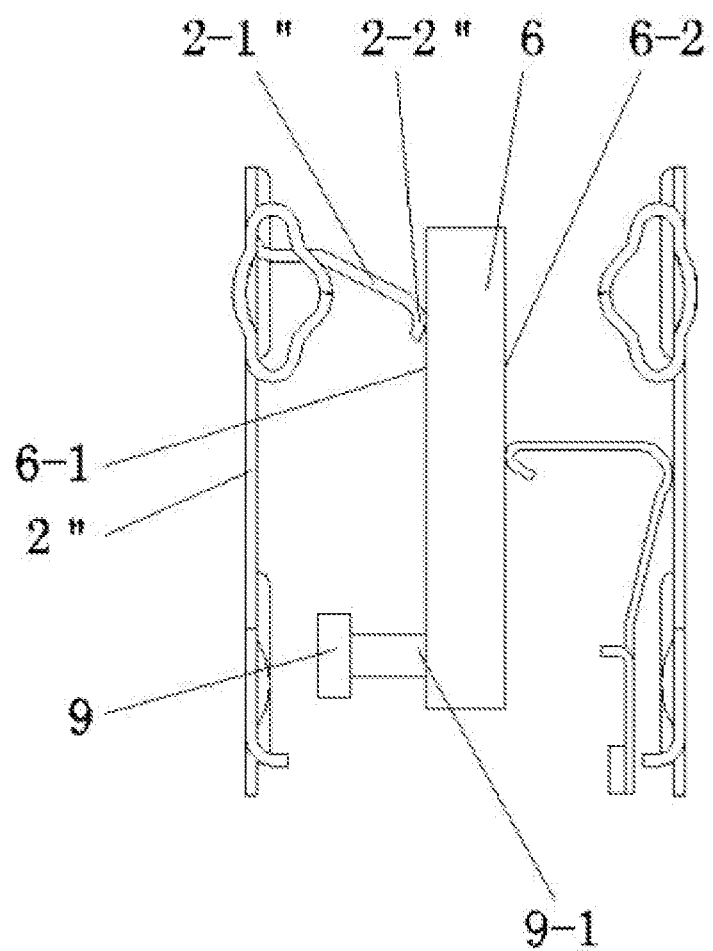
FIG. 15 is a schematic diagram of the structure of Embodiment III of the present invention.

FIG. 15 is a schematic diagram of Embodiment III of the present invention. The structure of Embodiment III is the same or similar to that of Embodiment I except for the differences expressed below.

In this embodiment, the first pin 2' is elastically provided with the first terminal 2-1'', and the first terminal contact part 2-2'' is arranged at an end of the first terminal 2-1''.

In this embodiment, the first elastic member 3 in Embodiment I is removed, and the support member 9 is added. The support member 9 is fixedly arranged in the base 1, and the support member 9 is provided with the support member contact part 9-1.

In this embodiment, when the first terminal 2-1" is in an elastic deformation state, the first terminal contact part 2-2" is in electrical contact with the first electrode 6-1 of the thermistor 6 and provides a clamping force. The support member contact part 9-1 is in contact with the first electrode 6-1 of the thermistor 6 to play a role of supporting. The first terminal contact part 2-2" and the support member contact part 9-1 are distributed on two sides of the center line of the first contact part 4-1 of the elastic element and opposite to the first contact part 4-1 of the elastic element. The first terminal contact part 2-2" and the support member contact part 9-1 are in electrical contact with an edge portion of the first electrode 6-1 of the thermistor. When the thermistor 6 is in a normal state, under the three-point clamping of the first terminal contact part 2-2", the support member contact part 9-1, and the first contact part 4-1 of the elastic element, the thermistor 6 is maintained in a force balance, resulting in that the thermistor 6 is fixedly arranged in the thermistor mounting cavity 1-1 and remains in a static state.

In this embodiment, the electrical circuit is the same as in Embodiment I.

Figure 16:
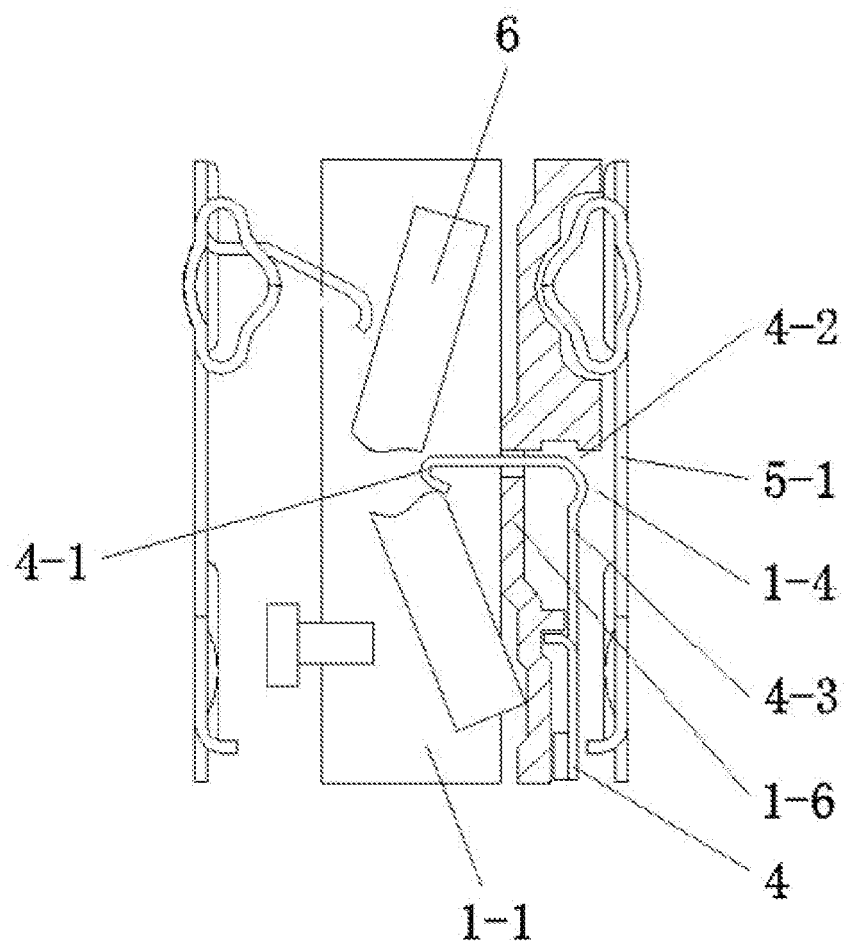
FIG. 16 is a schematic diagram of a ruptured state of the thermistor in Embodiment III of the present invention.

As shown in FIG. 16, in the present invention, when the PTC starter is in a fault state and the thermistor 6 ruptures, under the action of the elastic force of the elastic arm 4-3 of the elastic element, the elastic element contact part 4-1 pushes away the fragments of the ruptured thermistor 6, while the second contact part 4-2 of the elastic element is disengaged from the second pin contact part 5-1. At this time, the distance between the second contact part 4-2 of the elastic element and the second pin contact part 5-1 is sufficient to cut off the electrical connection between the second pin 5 and the second electrode 6-2 of the thermistor 6 to cut off the circuit. At the same time, through the protective effect of the isolation structure, the small granular fragments in the thermistor mounting cavity 1-1 are prevented from spreading into the elastic element mounting cavity 1-4 to avoid another hidden danger of short circuit between the second contact part 4-2 of the elastic element and the second pin contact part 5-1, which improves the reliability of cutting off the circuit.

What is claimed is:

1. A positive temperature coefficient (PTC) starter, comprising a housing, a first pin, a second pin, a thermistor, and an elastic element; wherein
  the first pin, the second pin, and the thermistor are arranged in the housing;
  the first pin is electrically connected to a first electrode of the thermistor;
  the housing is provided with a thermistor mounting cavity, and the thermistor is arranged in the thermistor mounting cavity;
  the housing is further provided with an elastic element mounting cavity, and the elastic element is arranged in the elastic element mounting cavity;
  a connecting piece is arranged on the elastic element, and two ends of the connecting piece are provided with a first contact part of the elastic element and a second contact part of the elastic element, respectively;
  the second pin is electrically connected to or disconnected from a second electrode of the thermistor through the connecting piece;
  when the thermistor is in a normal state, the elastic element is in an elastic deformation state, the first contact part of the elastic element is in electrical contact with the second electrode of the thermistor, the second contact part of the elastic element is in electrical contact with the second pin, and the second pin is electrically connected to the second electrode of the thermistor;
  after the thermistor ruptures, the elastic element resets, and the connecting piece is moved under a reset effect to push away the ruptured thermistor, so that the second contact part of the elastic element is disengaged from the second pin to cut off an electrical connection between the second pin and the second electrode of the thermistor; and
  an isolation structure is provided between the thermistor mounting cavity and the elastic element mounting cavity to prevent fragments of the thermistor in the thermistor mounting cavity from spreading into the elastic element mounting cavity, wherein
    the isolation structure comprises a base isolation wall and a cover isolation wall, wherein the base isolation wall and the cover isolation wall are combined together to isolate the thermistor mounting cavity and the elastic element mounting cavity.

2. The PTC starter according to claim 1, wherein
  the elastic element is further provided with a fixed piece and an elastic arm, the fixed piece is arranged in the elastic element mounting cavity, and the connecting piece is elastically arranged on the fixed piece through the elastic arm.

3. The PTC starter according to claim 1, wherein
  the base isolation wall and the cover isolation wall are fixed in the housing to isolate the thermistor mounting cavity and the elastic element mounting cavity.

4. The PTC starter according to claim 1, further comprising a first elastic member, wherein
  the first elastic member is arranged in the housing;
  the first elastic member is provided with a first elastic member contact part, and the first elastic member contact part is in contact with the first electrode of the thermistor;
  the first pin is provided with a first terminal contact part, and the first pin is in electrical contact with the first electrode of the thermistor through the first terminal contact part to realize an electrical connection between the first pin and the first electrode of the thermistor; and
  under a three-point clamping of the first terminal contact part, the first elastic member contact part, and the first contact part of the elastic element, the thermistor is fixedly arranged in the thermistor mounting cavity.

5. The PTC starter according to claim 4, wherein
  the first pin is provided with a first terminal, and the first terminal contact part is provided at an end of the first terminal.

6. The PTC starter according to claim 1, further comprising a second elastic member, wherein
  the second elastic member is electrically connected to the first pin;
  the second elastic member is provided with a first contact part of the second elastic member and a second contact part of the second elastic member, and the first contact part of the second elastic member and the second contact part of the second elastic member are in electrical contact with the first electrode of the thermistor to realize an electrical connection between the first pin and the first electrode of the thermistor; and
  under a three-point clamping of the first contact part of the second elastic member, the second contact part of the second elastic member, and the first contact part of the elastic element, the thermistor is fixedly arranged in the thermistor mounting cavity.

7. The PTC starter according to claim 1, further comprising a support member, wherein the support member is fixedly arranged in the housing;

the support member is provided with a support member contact part, and the support member contact part is in contact with the first electrode of the thermistor;

the first pin is elastically provided with a first terminal, and a first terminal contact part is arranged at an end of the first terminal;

the first terminal contact part is in electrical contact with the first electrode of the thermistor to realize an electrical connection between the first pin and the first electrode of the thermistor; and under a three-point clamping of the first terminal contact part, the support member contact part, and the first contact part of the elastic element, the thermistor is fixedly arranged in the thermistor mounting cavity.

8. The PTC starter according to claim 1, wherein the second pin is provided with a second pin contact part, and the second contact part of the elastic element is in electrical contact with or disengaged from the second pin through the second pin contact part.

9. The PTC starter according to claim 6, wherein when the second elastic member is in an elastic deformation state, the first contact part of the second elastic member and the second contact part of the second elastic member are in electrical contact with the first electrode of the thermistor.

10. The PTC starter according to claim 7, wherein when the first terminal is in an elastic deformation state, the first terminal contact part is in electrical contact with the first electrode of the thermistor.

11. The PTC starter according to claim 4, wherein when the first elastic member is in an elastic deformation state, the first elastic member contact part is in contact with the first electrode of the thermistor.

12. The PTC starter according to claim 4, wherein the first contact part of the elastic element is in electrical contact with a middle of the second electrode of the thermistor; and the first terminal contact part and the first elastic member contact part are distributed on two sides of a center line of the first contact part of the elastic element, and the first terminal contact part and the first elastic member contact part are in electrical contact with an edge portion of the first electrode of the thermistor.

13. The PTC starter according to claim 6, wherein the first contact part of the elastic element is in electrical contact with a middle of the second electrode of the thermistor; and the first contact part of the second elastic member and the second contact part of the second elastic member are distributed on two sides of a center line of the first contact part of the elastic element, and the first contact part of the second elastic member and the second contact part of the second elastic member are in electrical contact with an edge portion of the first electrode of the thermistor.

14. The PTC starter according to claim 7, wherein the first contact part of the elastic element is in electrical contact with a middle of the second electrode of the thermistor; and the first terminal contact part and the support member contact part are distributed on two sides of a center line of the first contact part of the elastic element, and the first terminal contact part and the support member contact part are in electrical contact with an edge portion of the first electrode of the thermistor.

* * * * *